Sept. 8, 1970  R. E. PRICE  3,527,840
CONTINUOUS REMOVAL OF HYDROFLUORIC ACID FROM AN
ALKYLATE HYDROCARBON STREAM
Filed March 15, 1968
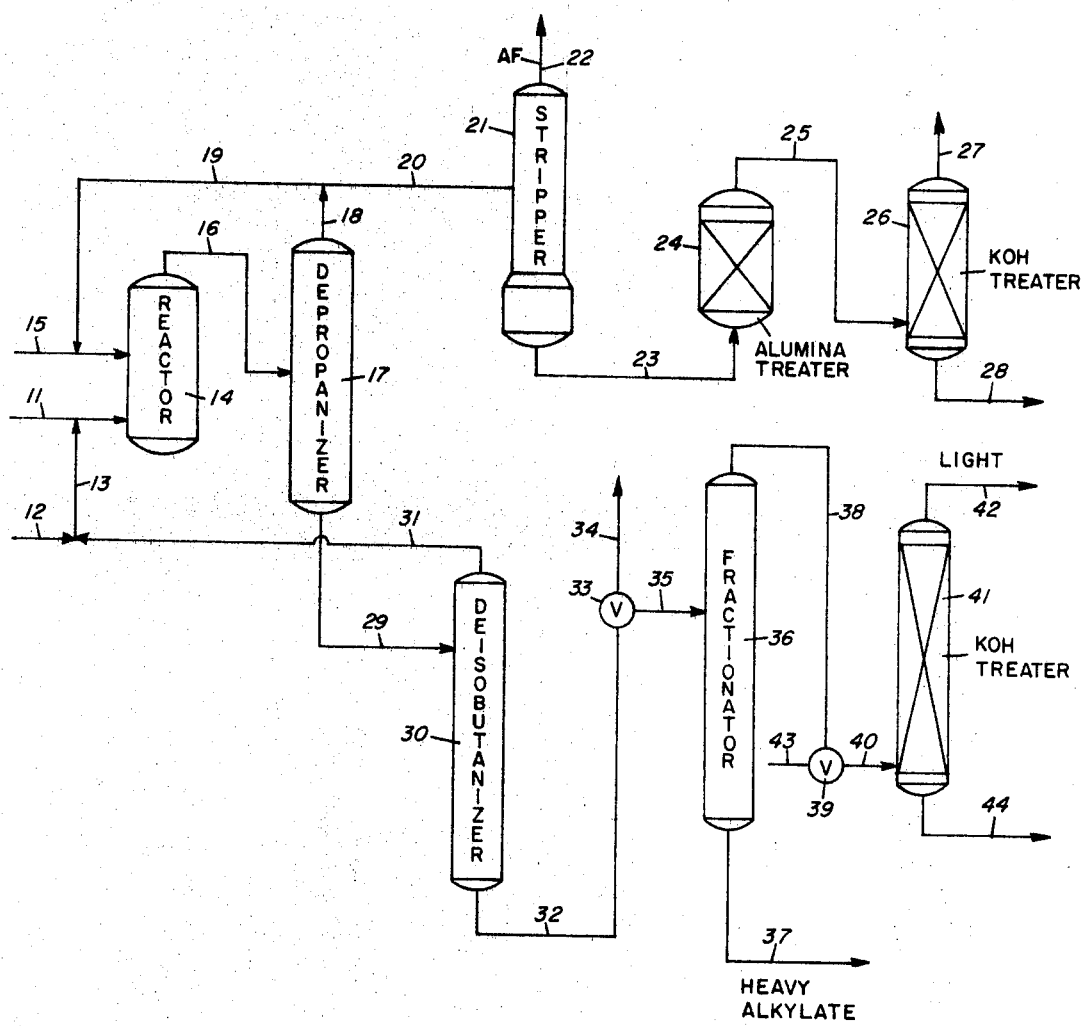
INVENTOR
ROBERT E. PRICE

United States Patent Office 3,527,840
Patented Sept. 8, 1970

3,527,840
CONTINUOUS REMOVAL OF HYDROFLUORIC ACID FROM AN ALKYLATE HYDROCARBON STREAM
Robert E. Price, Port Arthur, Tex., assignor to Gulf Oil Corporation, Pittsburgh, Pa., a corporation of Pennsylvania
Filed Mar. 15, 1968, Ser. No. 713,381
Int. Cl. C07c 3/54; C10g 19/00
U.S. Cl. 260—683.48                        12 Claims

ABSTRACT OF THE DISCLOSURE

Hydrofluoric acid is continuously removed from an alkylate hydrocarbon stream by admixing either water, steam or an aqueous alkali solution with the alkylate hydrocarbon stream and contacting the admixture with solid potassium hydroxide in a treating zone. This admixture maintains active potassium hydroxide surfaces by removing potassium fluoride coating as a sludge, thus avoiding interruptions during the treating process.

---

This invention relates to the separation of materials involved in a chemical reaction. More particularly, this invention relates to the continuous separation of hydrofluoric acid from a hydrocarbon stream employing a solid potassium hydroxide treating agent.

Hydrofluoric acid has found wide acceptance as a catalyst in the alkylation of alkylatable hydrocarbons with alkylating agents, such as unsaturated hydrocarbons. This catalyst provides excellent yields when an isoparaffin, such as isobutane, is reacted with olefinically unsaturated $C_3$, $C_4$, and/or $C_5$ hydrocarbons to produce high quality alkylate fractions.

Unfortunately, small amounts of hydrofluoric acid are present in the product alkylate streams due to the solubility of hydrofluoric acid in hydrocarbons. It is necessary to remove the hydrofluoric acid from these streams before subsequent processing or blending of the hydrocarbon streams, since hydrofluoric acid is highly corrosive, especially in the presence of moisture. However, the appreciable solubility of this acid in saturated hydrocarbons makes the recovery problem especially difficult.

It has been proposed to remove the hydrofluoric acid from hydrocarbon streams by percolating the acid-containing hydrocarbon streams through a bed of flake potassium hydroxide. This results in the neutralization of the hydrofluoric acid to form potassium fluoride. The employment of potassium hydroxide has been found to be especially desirable in the removal of hydrofluoric acid from the very light hydrocarbon fractions of such alkylation process streams, such as the propane and n-butane-rich streams. In the case of these streams, the solid potassium hydroxide requires no regeneration, since it is self-cleaning, i.e., the reaction product of the hydrofluoric acid and potassium hydroxide sloughs off the surface as it is formed so that a fresh surface is always encountered by the entering acid-containing hydrocarbon stream.

However, great difficulties are encountered when hydrocarbon streams such as the light alkylate streams comprising the iso-$C_5$+ hydrocarbons and small amounts of hydrofluoric acid are contacted with the solid potassium hydroxide. In these situations the reaction product of the hydrofluoric acid and the potassium hydroxide coats the surfaces of the hydroxide and hinders further neutralization without being self-cleaning. The premature inhibition of the neutralization of the acid contaminant permits the mechanical entrainment of potassium fluoride in the neutralized effluent stream in addition to reducing the effectiveness of the neutralization reaction. Furthermore, incomplete use of the potassium hydroxide requires that the treating vessel be taken off-stream in order for fresh reagent to be exchanged for the spent reagent, so as to restore treating capacity, thus interrupting the treating process. This interruption is further complicated by the hazards presented in emptying the treating vessel. Ordinarily, the spent treating agent is washed out with water since removal in the solid state is not practical, and high temperatures are generated by the high heats of solution of both potassium fluoride and potassium hydroxide in water.

It has now been found that the foregoing difficulties can be eliminated and a continuous treating process can be conducted in the potassium hydroxide treatment of the alkylate streams. In accordance with the present invention, a process is provided for the continuous removal of hydrofluoric acid from an alkylated hydrocarbon-containing stream, which process comprises contacting the contaminated stream with solid potassium hydroxide in a treating zone, and concurrently admixing an aqueous medium with the alkylated hydrocarbon stream. The aqueous treating medium is employed in amounts sufficient to form a sludge comprising potassium fluoride and potassium hydroxide, which sludge may be easily removed from the treating zone.

Surprisingly, the process of the present invention permits the continuous removal of the potassium hydroxide-hydrofluoric acid reaction product as it is formed by solubilizing this product in a controlled amount of aqueous media that is continuously admixed with the feed stream to the potassium hydroxide treater. This technique not only continuously maintains active potassium hydroxide surfaces in the treater, but the basic treating material is utilized to virtually complete consumption thus avoiding interruption to the treating process. The present process avoids the hazardous problem of emptying the treating vessel of mixed potassium hydroxide and potassium fluoride, since the treating vessel will be virtually empty by the time the treating agent is used up. Also, this avoids the problem of handling a hot caustic solution. Likewise, the present invention avoids carryover of potassium fluoride into the treated effluent stream by effecting its continuous elimination from the treating zone in the form of an easily removable sludge.

Further advantages of the invention will become apparent to those skilled in the art from the disclosure including the detailed description of the invention and the appended drawing wherein:

The sole figure is a schematic flow sheet of a preferred embodiment of the invention.

Referring to the drawing, an alkylatable hydrocarbon, such as propylene, butylenes, amylenes or mixtures thereof, is introduced into conduct 11. Meanwhile, a suitable proportion of an alkylating hydrocarbon, such as isobutane, is introuced into conduit 11 by means of the lines 12 and 13 for admixture with the olefinic hydrocarbon. The resulting reaction mixture is introduced into reactor 14. Fresh hydrofluoric acid catalyst (hereinafter referred to as HF) is introduced into the reactor 14 by means of the line 15 and reaction between the olefin and the isoparaffin occurs very rapidly, e.g., within about 0.1 to about 0.3 second.

The reaction effluent is discharged from the reactor 14 by means of the line 16 whereby it is introduced into the depropanizer vessel 17 from which a stream containing propane, HF, and organic fluorides is withdrawn by means of the line 18. A portion of this stream may be recycled to the reactor 14 by means of the lines 19 and 15 for reuse in the process. The remaining portion of the stream 18 is passed by means of the conduit 20 as feed to the HF stripper 21. Stripper 21 removes HF from the propane and the HF is removed via the conduit 22 and may be returned to the reactor 14 (by a means not shown) and introduced therein by the line 15.

Substantially HF-free propane, e.g., below about one and about 30 p.p.m. HF, is withdrawn from the stripper 21 by means of the line 23 and is introduced into the treating vessel 24, which is provided with a suitable solid defluorination material, such as alumina, for the removal of organic fluorides, such as alkyl fluorides from the propane. Alternative solid contact material for this purpose includes carbon, bauxite and the like. It may be suitably provided in the treating vessel 24 in the form of rings, cubes, spheres, natural lumps and the like. More than one treating vessel 24 may be employed if desired. The propane stream 23 preferably contains less than one p.p.m. HF so as to minimize HF losses and to conserve the defluorination material, e.g., alumina.

The substantially organic fluoride-free propane is withdrawn from the treater 24 by means of the conduit 25 by means of which it is introduced into the potassium hydroxide (hereinafter referred to as KOH) treater 26 for removal of the minor amounts of organic fluorides usually between about one and about 50 p.p.m. still remaining in the propane. Substantially pure propane is removed overhead from the treater 26 by means of the line 27 while an aqueous solution of the KOH-HF reaction product is discharged by means of the conduit 28.

The water content of stream 28 is by virtue of the water that is present in the overhead stream 18 from the depropanizer 17 along with the propane and that which is formed by the reaction of an HF present in the KOH treater 26 according to the equation:

$$HF + KOH \rightarrow KF + H_2O$$

The treater 26 continuously operates in a satisfactory manner and without interruption. The coating of the surface of the KOH treating agent is not a problem in the treater 26.

Referring again to the depropanizer 17, a substantially propane-free alkylated hydrocarbon is discharged from the depropanizer 17 by means of the conduit 29 and is introduced into the deisobutanizer 30, from which an isobutane-rich stream 31 is recovered overhead. The isobutane stream is recycled for further utilization in the reactor 14 by means of the line 13 wherein admixture of this recycle isobutane with fresh isobutane that is introduced in conduit 12 occurs. An alklate-rich fraction that has been depleted of normally aqueous hydrocarbons including propane and isobutane is discharged from the deisobutanizer 30 via the conduit 32 and may pass by means of the three-way valve 33 and conduit 34 to a fractionator (not shown) for separation of the hydrocarbon fraction into n-butane and gasoline fractions, respectively. This n-butane stream may be treated with solid KOH for the removal of residual HF (in a KOH treater not shown). The treatment of this light hydrocarbon stream with KOH is very satisfactory, since any KF-KOH merely sloughs off the surface as formed. Thus, as in the case of the propane KOH treater 26, the KOH treatment of the n-butane stream continues uninterrupted until the solid treating agent is consumed.

It is preferred, however, to pass at least a major portion, if not all, of the alkylate product stream 32 by means of the valve 33 and the conduit 35 to the fractionator 36 to effect a separation of the product stream into a light alkylate stream and a heavy alkylate fraction. The light alkylate stream suitably has an initial boiling point above about 90° F. and an end point between about 300° and about 320° F. The heavy alkylate fraction suitably has an initial boiling point above about 330° F. A heavy alkylate fraction is discharged from the bottom of fractionator 36 by means of the line 37. This material finds suitable use as a component of motor fuel, charcoal starter fluid and the like.

A light alkylate overhead fraction is removed by means of the line 38 and is passed by means of the valve 39 and line 40 to the solid KOH treating vessel 41. In the treater 41 the residual HF is removed from the light alkylate stream. However, after a relatively short period of time the light alkylate feed stream must be cut off by means of the valve 39. At this time, the active surfaces of the solid KOH becomes coated with HF-KOH reaction product and the KF becomes entrained in the light alkylate product that is recovered by means of the line 42. In order to prevent this difficulty, aqueous media, such as water in liquid form or as steam, is admixed with the light alkylate stream prior to entry into the treater 41 by continuously injecting water or steam by means of the conduit 43 into the conduit 40.

It is vital to the success of the present invention that the amount of aqueous media that is injected is controlled within a relatively narrow range. Thus, aqueous media must be admixed with the light alkylate stream in amounts sufficient to cause the formation of an easily removable sludge, which may be recovered from the treater 41, for example, by means of the line 44. Preferably, the amount of aqueous media employed should be that just about sufficient to saturate the light alkylate stream, but not so much as to form a separate aqueous phase. If more water or steam is employed than is necessary to saturate the hydrocarbon stream, a weak acid solution is recovered from the bottom of the KOH treating unit. This acid solution creates a highly corrosive condition in the pipes and in the bottom of the KOH treating unit. Suitable amounts of aqueous media to be injected in the alkylate stream include, for example, that sufficient to result in an alkylated hydrocarbon stream containing between about 20 and about 100 p.p.m. of aqueous medium, preferably between about 25 and about 50 p.p.m.

The aqueous medium may be admixed with the alkylate stream employing any suitable means. Thus, nozzles, aspirators, jet-injectors, in-line mixers and the like may be suitably employed. The aqueous medium can be directly introduced into the KOH treater, e.g., at a plurality of points along the treater. However, it is preferred to admix the aqueous medium with the alkylate stream prior to the introduction of the alkylate stream into the KOH treater.

While it is not intended to limit the present invention to any particular theory, it is believed that the n-butane-KOH treater functions satisfactorily because a small amount of water, that is present in the total alkylate, is taken overhead with the n-butane that is sent to the treater. This supplements that produced in the reaction of the HF wih the KOH and enough water is present to solubilize the KF formed on the KOH surfaces. In the case of the propane-KOH treater, a considerable amount of water is produced in the alumina treater 24 (see figure) by virtue of the conversion of the organic fluorides to $AlF_3$ and water. Apparently, in these respective KOH treaters, the water present is sufficient to avoid interruption to the treating process. However, in the case of the light alkylate insufficient water is present and/or produced in the KOH treater. There is some water present in the total alkylate that goes overhead with the light alkylate or n-butane (whichever is produced). However, since the light alkylate comprises about 95 percent of the total alkylate stream, whereas the n-butane comprises only about 15 to 25 percent of the total alkylate stream, sufficient water for successful operation is inherently present in the latter case, but not in the former.

The following example is presented for illustrative purposes only and is not intended to limit the present invention. The equipment employed is similar to that shown in the drawing, so that numerical reference will be made to the figure.

EXAMPLE 1

An isobutane feedstock in the amount of 7,258 b./s.d. is charged along with 8,601 b./s.d. of a propylene-propane feed and 7,405 b./s.d. of a butylene-amylene feed are passed to the alkylation reactor 14 along with 510,000 b./s.d. HF.

A propane-rich stream is removed overhead from the depropanizer and is passed to the HF stripper 17 for recovery of HF therefrom. The bottoms from the HF stripper containing 33 p.p.m. water and 64 p.p.m. organic fluorides is passed to an alumina defluorinator. The effluent is discharged from the defluorinator at a temperature of 95° F. under a pressure of 265 p.s.i.g. and contains 73 p.p.m. water and a small amount of organic fluorides HF, and other water soluble fluorides. This stream is introduced into a KOH treater 26 and high purity propane in an amount of 3,764 b./s.d. is recovered from the KOH treater. This treater continuously operates satisfactorily and without interruption.

Meanwhile, the depropanizer bottoms is debutanized and is introduced at a temperature of 270° F. and a pressure of 16 p.s.i.g. to the fractionator 36. This stream is split into a light alkylate fraction and a heavy alkylate fraction. These streams have the characteristics set forth in Table 1, below:

TABLE I

|  | Gravity, API | Water, p.p.m. | Distillation, ° F. | | | | |
| --- | --- | --- | --- | --- | --- | --- | --- |
|  |  |  | OP | 10 | 50 | 90 | EP |
| Charge to fractionator | 74.4 | 30 | 92 | 130 | 210 | 304 | 400 |
| Light alkylate fraction | 76.3 | 12 | 90 | 124 | 206 | 242 | 304 |
| Heavy alkylate fraction | 55.5 | 27 | 338 | 350 | 360 | 424 | 506 |

The heavy alkylate is withdrawn at a temperature of 412° F. and pressure 16 p.s.i.g. and recovered at the rate of 1,101 b./s.d. The light alkylate fraction is withdrawn from the fractionator at a temperature of 235° F. and pressure of 16 p.s.i.g. and is introduced into a KOH treater after being cooled to a temperature of 101° F. and pressured to 175 p.s.i.g. The light alkylate effluent is recovered from the KOH treater at a rate of 14,262 b./s.d. However, within a relatively short period of time small amounts of KF become entrained in the light alkylate effluent. Also, increasing amounts of HF are likewise noted therein indicating the increasing ineffectiveness of the KOH in neutralizing the HF.

EXAMPLE 2

The foregoing procedure is repeated, except that steam is continuously injected into the light alkylate stream prior to its introduction into the KOH treater so as to result in a water content of between about 20 and about 100 p.p.m. in the alkylate stream. Under these conditions, the light alkylate KOH treater continues to operate without interruption. A basic sludge comprising 19.7 percent by weight KOH and 24.0 percent by weight KF is withdrawn from the bottom of the KOH treater. The KF content of the sludge and the satisfactory operation of the treater indicates that the KF is being solubilized from the surface of the KOH as formed. The light alkylate effluent is free from HF and mechanically entrained KF and/or KOH, or solutions thereof.

Many modifications of the process of the present invention as hereinabove described may be made without departing from the spirit and scope of the present invention. For example, additional fractionators and treating vessels may be employed in stages if desired. Likewise suitable pumps, valves, fractionators, coolers and the like, such as are well known in the art may be suitably employed.

The term "aqueous medium" as employed herein includes, of course, water in the form of liquid or steam, as well as aqueous solutions such as an alkali solution. For example, a dilute KOH solution may be employed. This will reduce the possibility of corrosion in that portion of the steel equipment between the point of injection of the aqueous media and the KOH treater.

The invention has been described in considerable detail hereinabove. However, only those limitations should be imposed as are recited in the claims hereinafter presented.

I claim:

1. A process for the continuous removal of HF from an alkylate hydrocarbon stream in the contact presence of solid KOH which comprises admixing said stream with a separate aqueous medium selected from the group consisting of water, steam and an aqueous alkali solution, contacting said stream and medium admixture with solid KOH in a treating zone, the amount of said aqueous medium in said admixture being sufficient to form a sludge in said treating zone and removing said sludge from said treating zone.

2. A process in accordance with claim 1 wherein said admixing of the hydrocarbon stream with the aqueous medium is carried out prior to contacting said admixture with solid KOH.

3. A process in accordance with claim 2 wherein the aqueous medium is steam.

4. A process in accordance with claim 2 wherein said hydrocarbon stream is a light alkylate fraction in an HF alkylation process.

5. A process in accordance with claim 1 wherein sufficient aqueous medium is admixed with the alkylate hydrocarbon stream to result in a concentration of from about 20 to about 100 p.p.m. of water.

6. A process in accordance with claim 2 wherein the aqueous medium is employed in amounts sufficient to saturate the alkylated hydrocarbon containing stream.

7. A process in accordance with claim 2 wherein the alkylate hydrocarbon stream comprises a fraction having an initial boiling point above about 90° F. and an end point between about 300° F. and 320° F.

8. A process for the production of a substantially HF-free light alkylate stream, which comprises reacting an alkylated hydrocarbon with an alkylatable hydrocarbon in the presence of HF so as to obtain an alkylation reaction effluent comprising normally gaseous hydrocarbons and alkylated hydrocarbons, separating a substantial portion of normally gaseous hydrocarbons from said reaction effluent, separating a light alkylate fraction from said reaction effluent, admixing said light alkylate stream with a separate aqueous medium selected from the group consisting of water and an aqueous alkali solution, contacting said light alkylate stream with solid, particulate KOH in a treating zone, the amount of said aqueous medium in said admixture being sufficient to form a sludge in said treating zone and removing said sludge from said treating zone.

9. A process in accordance with claim 8 wherein said admixing of the light alkylate stream with the aqueous medium is carried out prior to contacting the admixture with solid KOH.

10. A process in accordance with claim 8 wherein the aqueous medium is water.

11. A process in accordance with claim 8 wherein the separated normally gaseous hydrocarbons comprise propane and said propane is continuously contacted with solid KOH in a treating zone separate from that employed for the contacting of a light alkylate stream.

12. A process in accordance with claim 8 wherein the light alkylate stream boils in the range of between about 90° F. and about 320° F.

References Cited

UNITED STATES PATENTS

| 2,377,546 | 6/1945 | Frey | 260—683.41 |
| 3,403,198 | 9/1968 | Van Pool | 260—683.42 |
| 3,254,137 | 5/1966 | Hutto et al. | 260—683.48 |

GEORGE J. CRASANAKIS, Assistant Examiner

U.S. Cl. X.R.

208—263, 285, 288

PO-1050
(5/69)

UNITED STATES PATENT OFFICE
CERTIFICATE OF CORRECTION

Patent No. 3,527,840          Dated September 8, 1970

Inventor(s) Robert E. Price

It is certified that error appears in the above-identified patent and that said Letters Patent are hereby corrected as shown below:

Column 2, line 54, "conduct" should read --conduit --.
Column 3, line 31, "an" should read -- any --.
Column 3, line 48, "aqueous" should read -- gaseous --.

Signed and sealed this 11th day of May 1971.

(SEAL)
Attest:

EDWARD M. FLETCHER, JR.
Attesting Officer

WILLIAM E. SCHUYLER, JR.
Commissioner of Patents